United States Patent
Ambichl et al.

(10) Patent No.: US 10,417,065 B2
(45) Date of Patent: Sep. 17, 2019

(54) METHOD AND SYSTEM FOR AUTOMATED AGENT INJECTION IN CONTAINER ENVIRONMENTS

(71) Applicant: Dynatrace LLC, Waltham, MA (US)

(72) Inventors: Ernst Ambichl, Altenberg (AT); Thomas Koeckerbauer, Mittertreffling (AT); Gernot Reisinger, Linz (AT)

(73) Assignee: Dynatrace LLC, Waltham, MA (US)

( * ) Notice: Subject to any disclaimer, the term of this patent is extended or adjusted under 35 U.S.C. 154(b) by 0 days.

(21) Appl. No.: 15/618,964

(22) Filed: Jun. 9, 2017

(65) Prior Publication Data

US 2018/0357068 A1    Dec. 13, 2018

Related U.S. Application Data

(60) Provisional application No. 62/349,336, filed on Jun. 13, 2016.

(51) Int. Cl.
| | |
|---|---|
| *G06F 13/00* | (2006.01) |
| *G06F 9/54* | (2006.01) |
| *G06F 9/455* | (2018.01) |
| *G06F 9/445* | (2018.01) |

(52) U.S. Cl.
CPC .......... *G06F 9/545* (2013.01); *G06F 9/44521* (2013.01); *G06F 9/455* (2013.01); *G06F 2009/45591* (2013.01)

(58) Field of Classification Search
CPC .............................. G06F 9/44505; G06F 9/445
See application file for complete search history.

(56) References Cited

U.S. PATENT DOCUMENTS

| | | | |
|---|---|---|---|
| 8,234,631 B2 | 7/2012 | Greifeneder et al. | |
| 8,402,443 B2 | 3/2013 | Greifeneder et al. | |
| 8,464,225 B2 | 6/2013 | Greifeneder | |
| 2012/0072480 A1* | 3/2012 | Hays | G06F 9/5061 709/202 |
| 2016/0105350 A1 | 4/2016 | Greifeneder et al. | |
| 2017/0078182 A1 | 3/2017 | Spiegl et al. | |
| 2018/0152534 A1* | 5/2018 | Kristiansson | H04L 67/16 |
| 2018/0157516 A1* | 6/2018 | Kristiansson | G06F 9/5027 |
| 2018/0246812 A1* | 8/2018 | Aronovich | G06F 12/0888 |
| 2018/0247064 A1* | 8/2018 | Aronovich | G06F 21/6209 |

* cited by examiner

*Primary Examiner* — Timothy A Mudrick
*Assistant Examiner* — Abdou K Seye
(74) *Attorney, Agent, or Firm* — Harness, Dickey & Pierce, P.L.C.

(57) ABSTRACT

A system and method is presented that installs an agent on a computer system that monitors the start of processes by the computer system and that identifies the start of processes that perform container management activities, like starting and stopping container environments. On start of a container manager process, the agent starts a container manager agent that establishes a monitoring connection to the container manager process. The container manager agent monitors activities performed by the container manager process to detect the start of new container environments by the container manager process. On detection of a container start, the container manager agent manipulates the container configuration in a way that a process type specific in-process agent is automatically injected into processes started inside the container.

28 Claims, 14 Drawing Sheets

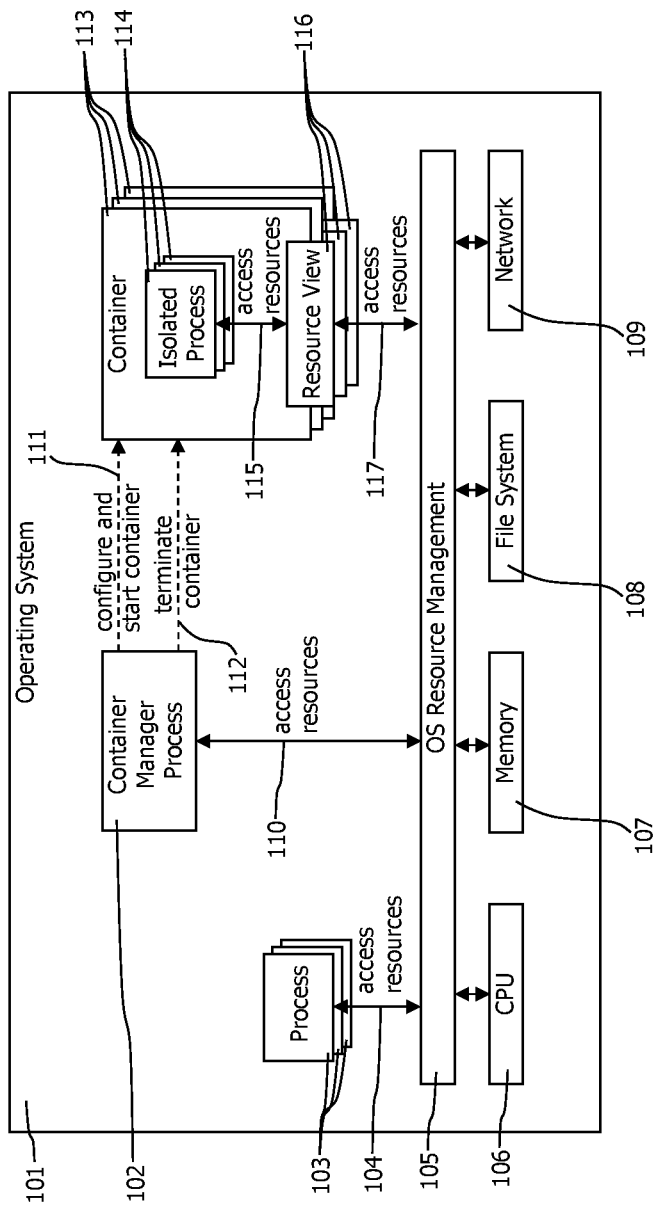
FIG 1: Container Based Process Isolation

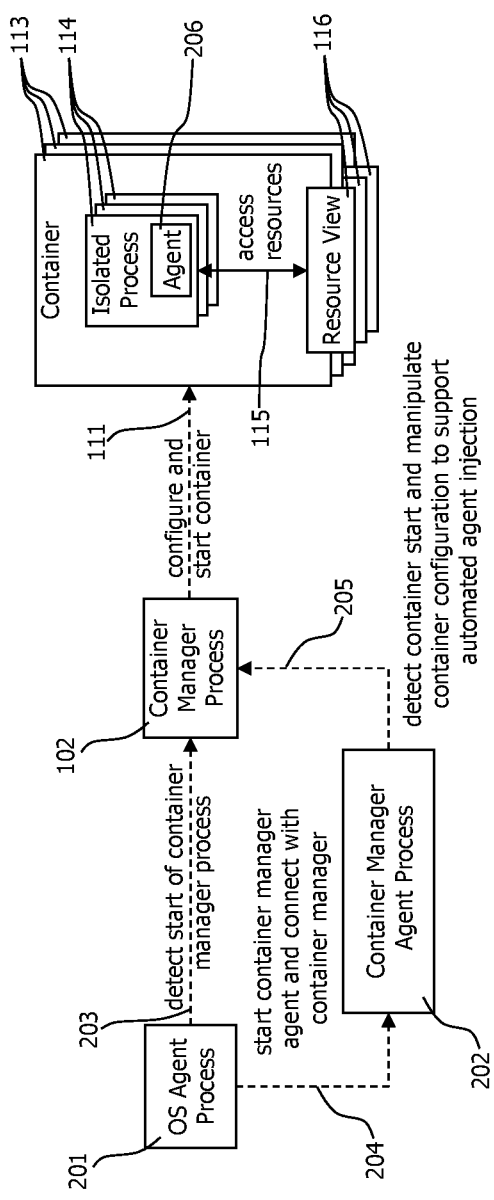
FIG 2: Automated Agent Injection in Container Isolated Processes

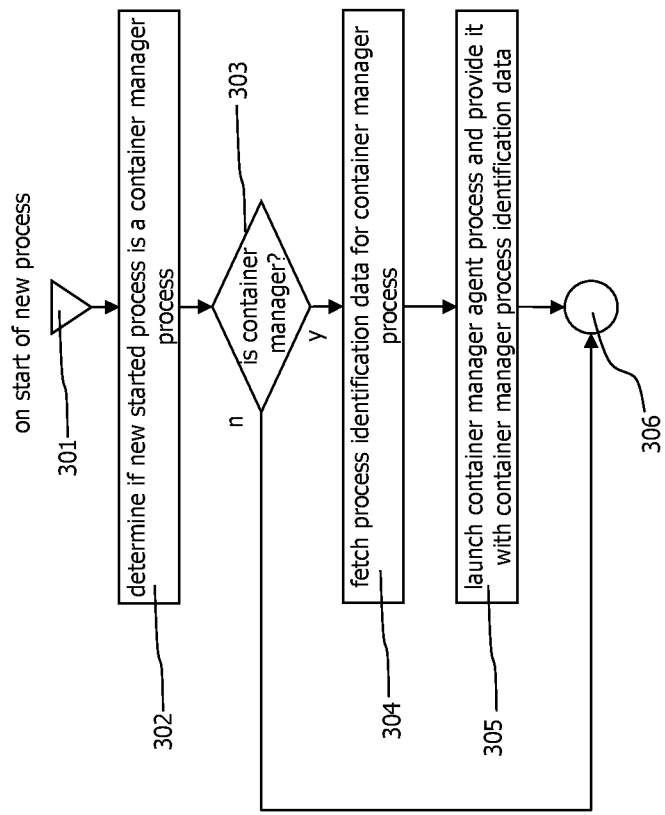
FIG 3: Detection of Container Manager Process by OS Agent

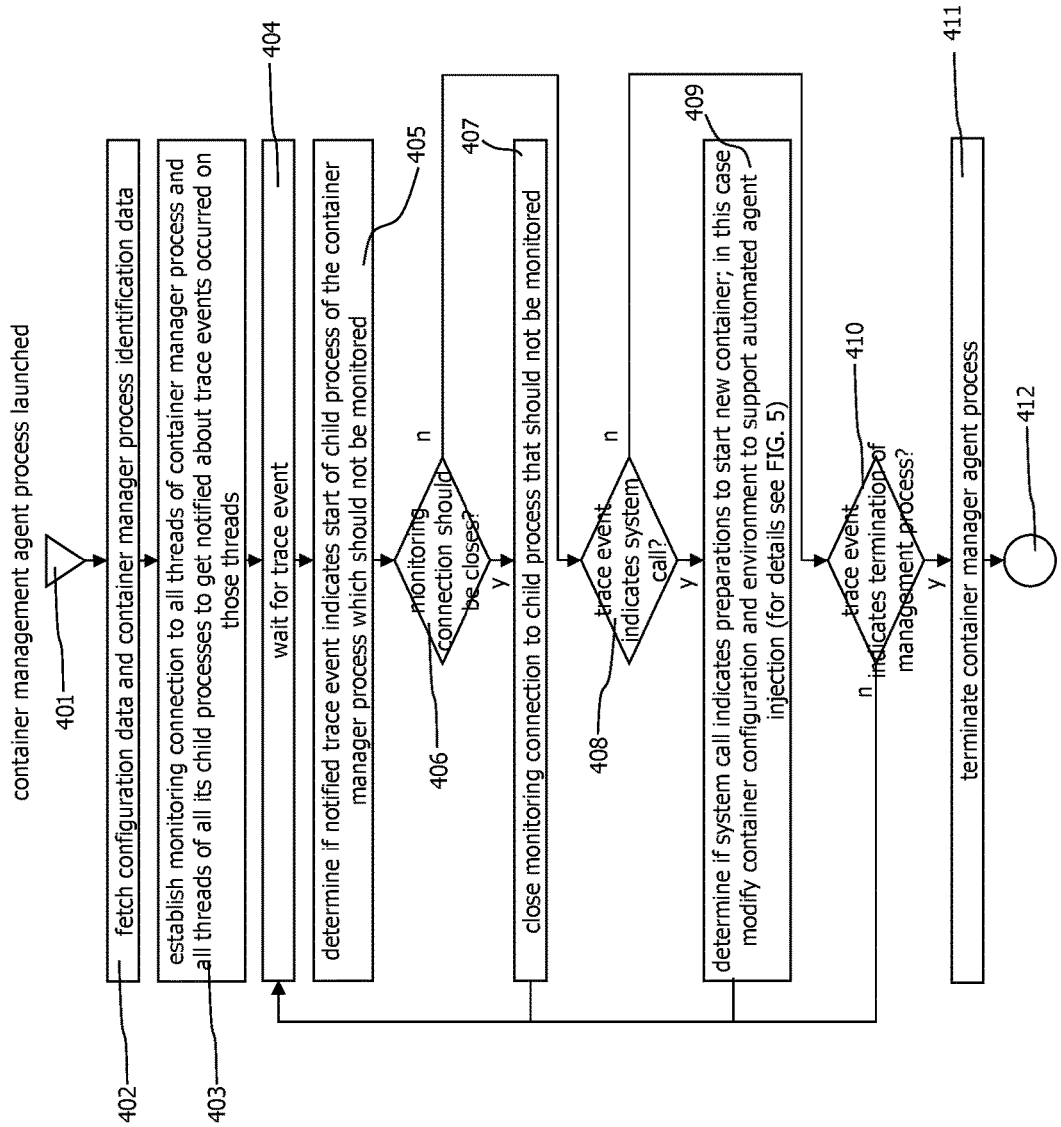

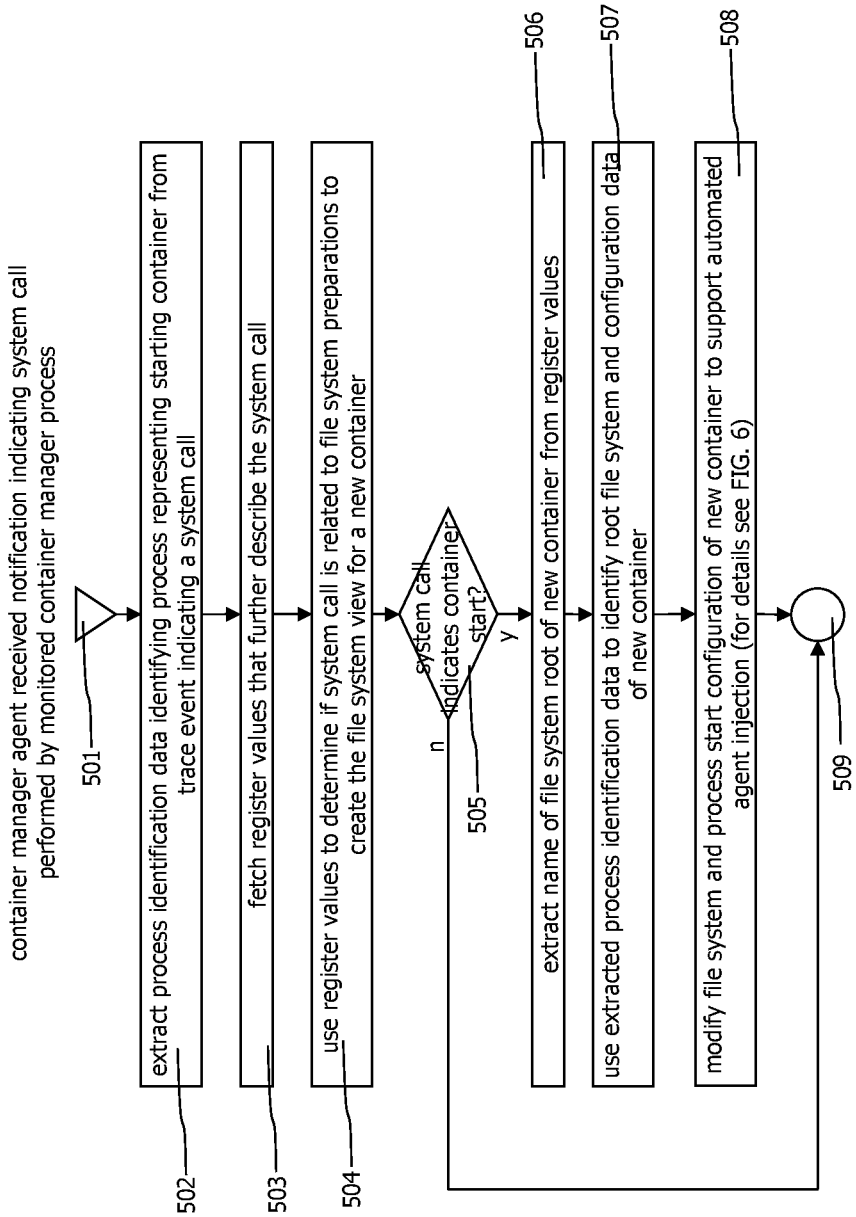
FIG 5: Processing of Monitoring Event From A Container Manager Process By A Container Manager Agent

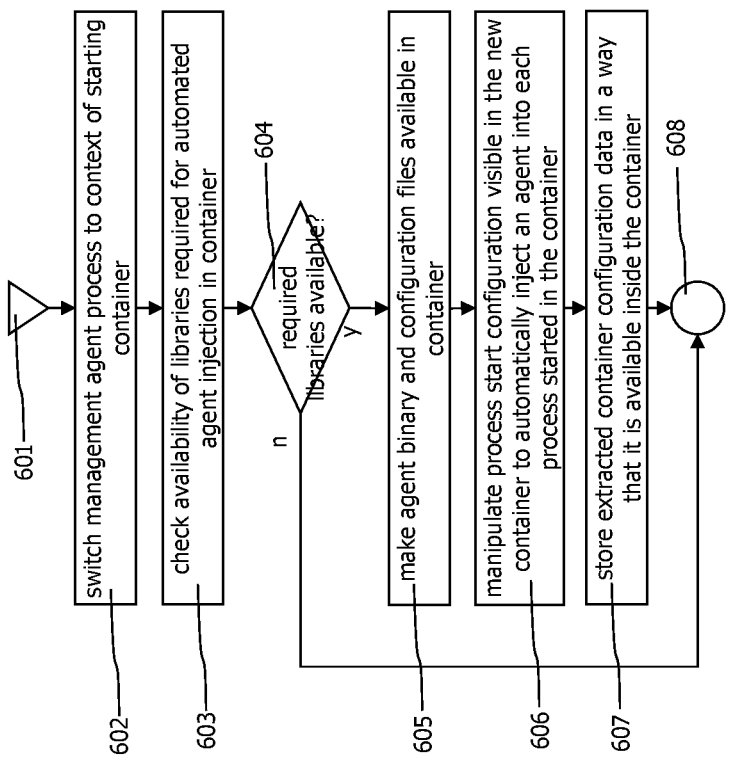
FIG 6: Processing of Container Start Trace Events By Container Manager Agent

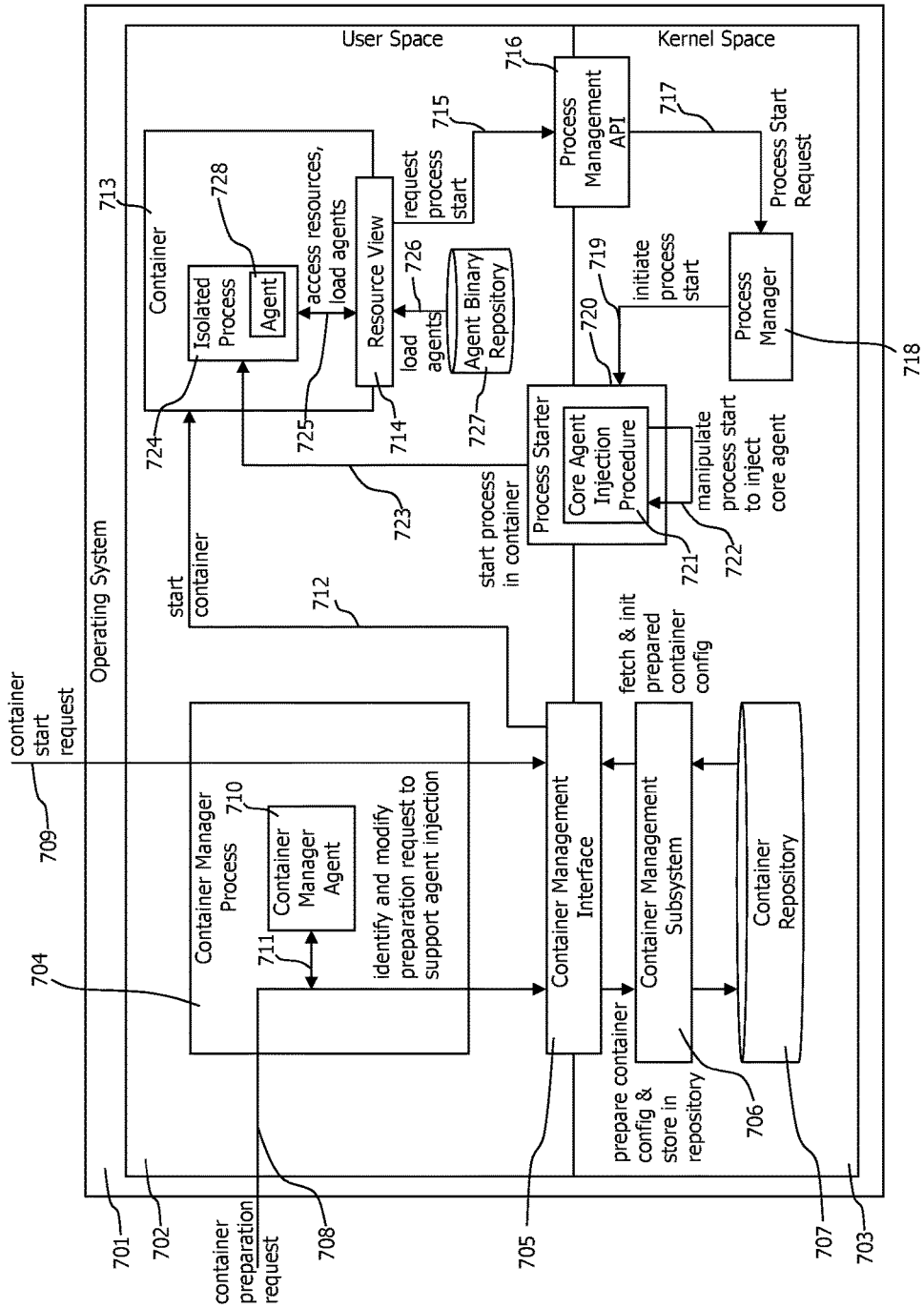
FIG 7: Kernel Side Agent Injection into Container Processes

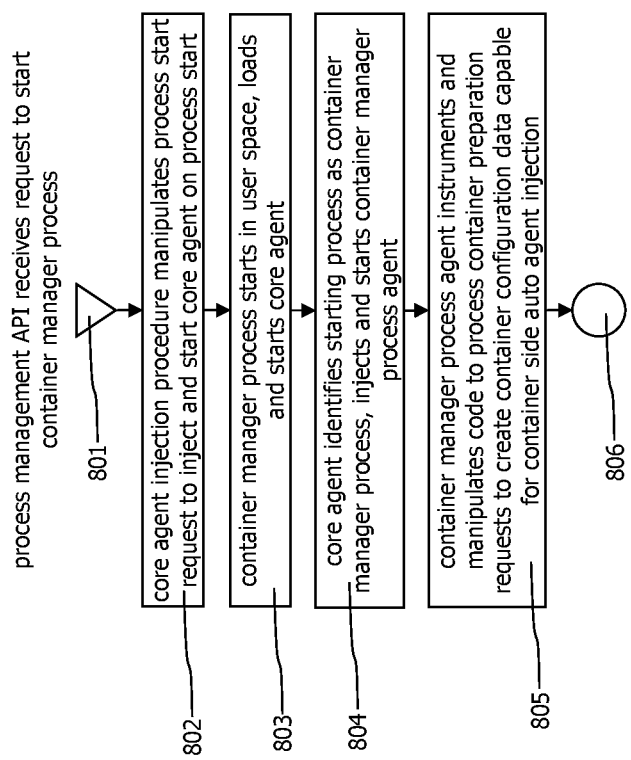
FIG 8: Startup of Container Manager Process

FIG 9: Processing of Exemplary Container Management Requests
FIG. 9a: Container Preparation Request
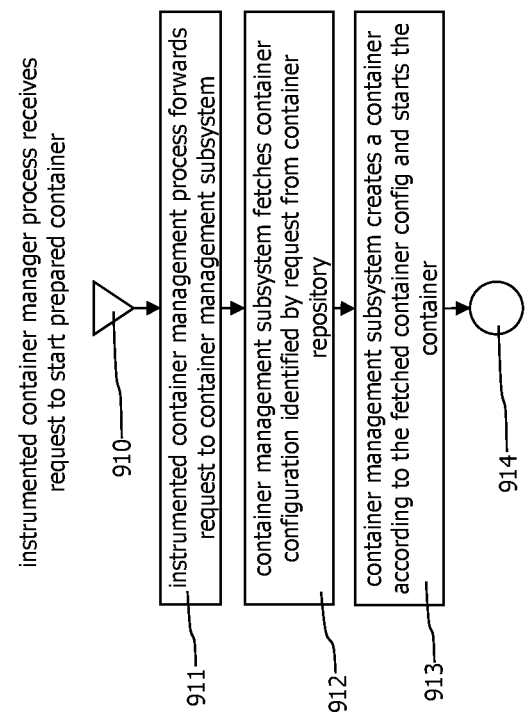
FIG. 9b: Container Start Request
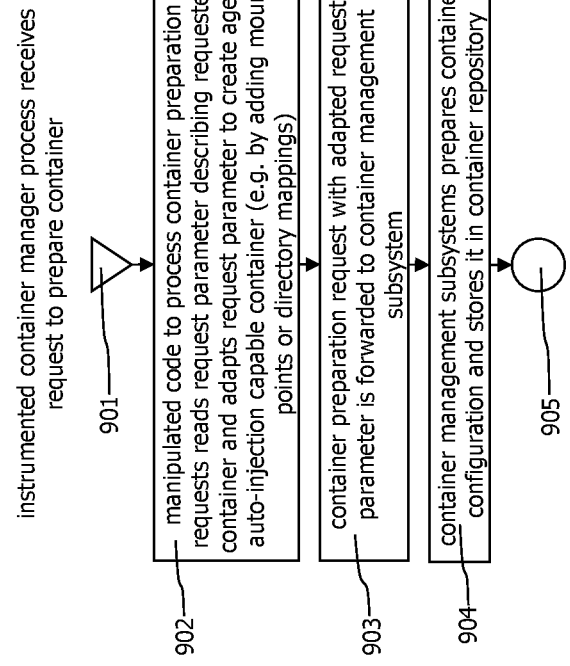

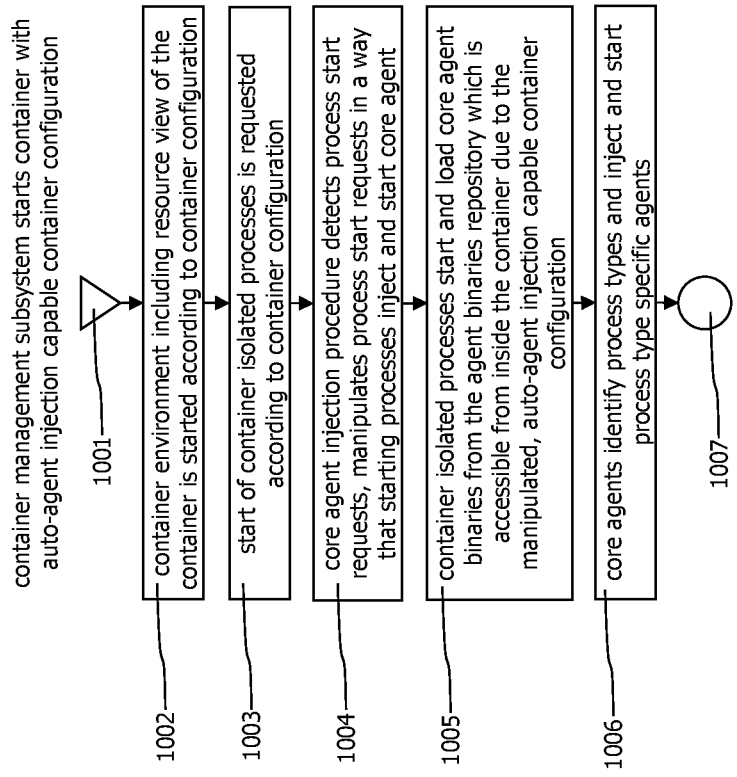
FIG 10: Container Startup

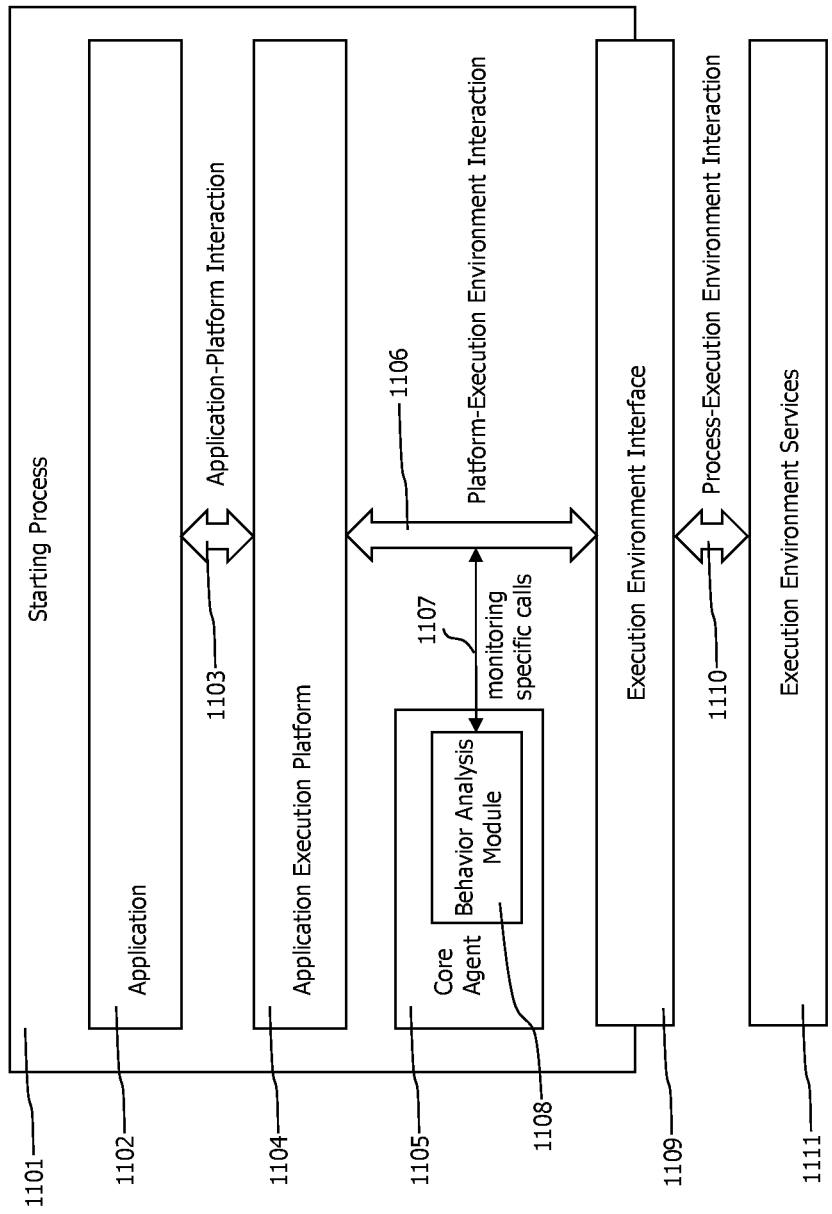
FIG 11: Behavioral Driven Process Type Detection Overview

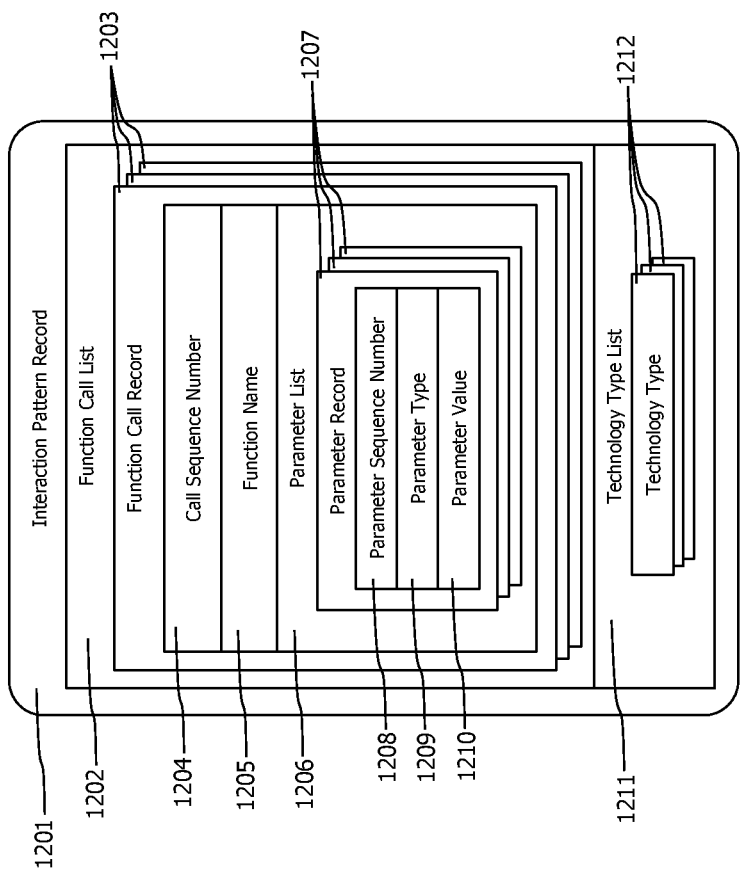
FIG 12: Interaction Pattern Record

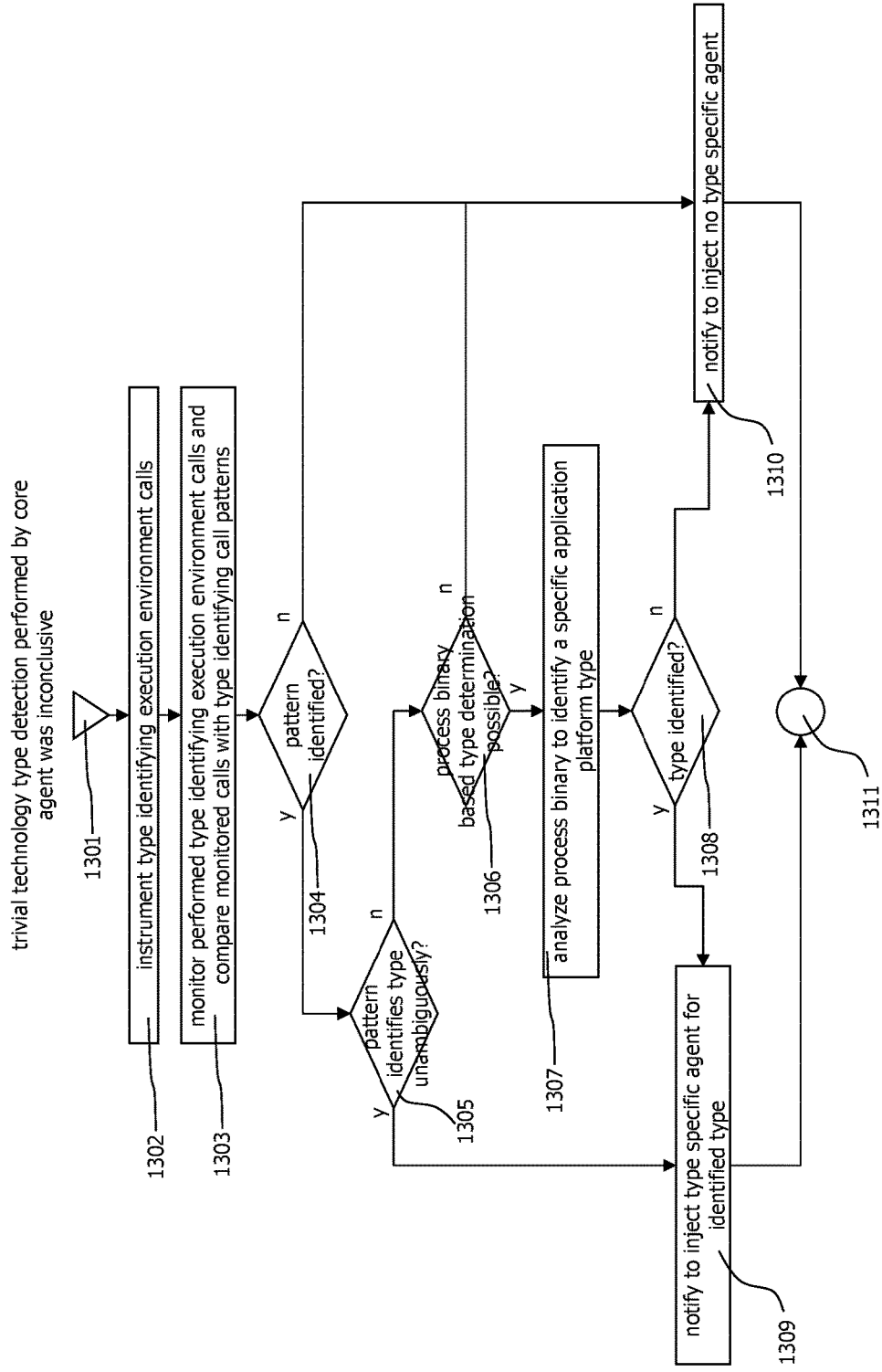
FIG 13: Analysis of Start-Time Process Activities to Determine Process Type

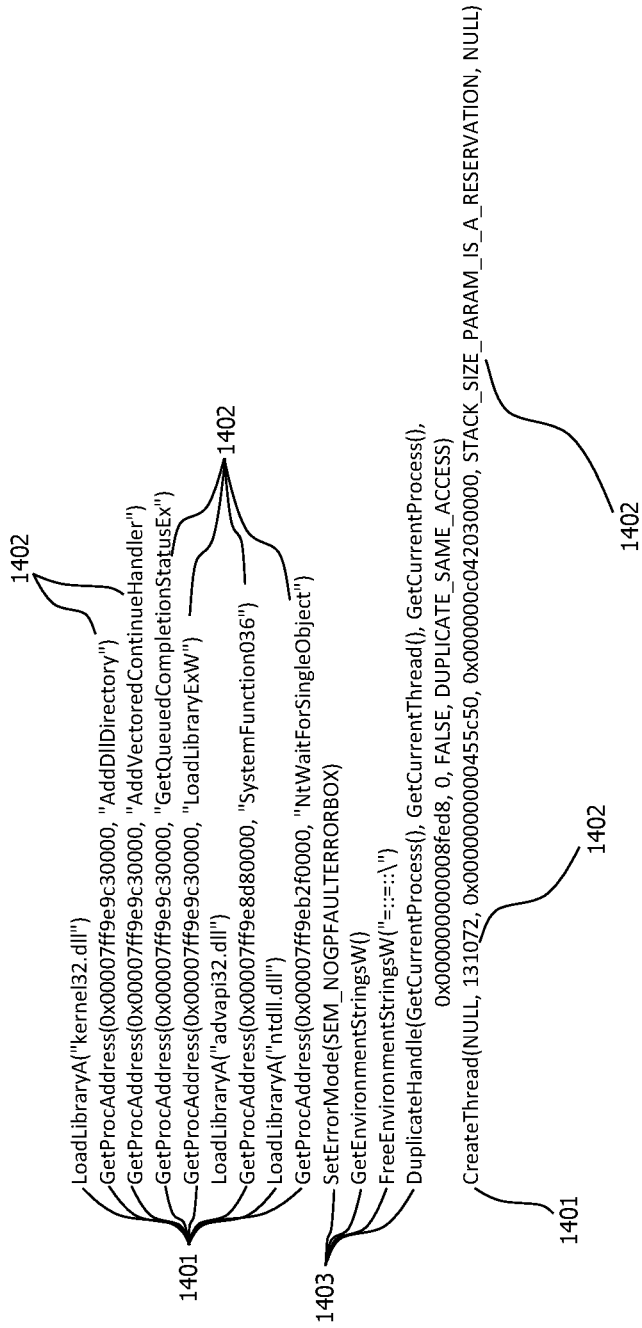
FIG 14: Exemplary Startup Call Sequence Technology Type Go Runtime

METHOD AND SYSTEM FOR AUTOMATED AGENT INJECTION IN CONTAINER ENVIRONMENTS

CROSS-REFERENCE TO RELATED APPLICATIONS

This application claims the benefit of U.S. Provisional Application No. 62/349,336, filed on Jun. 13, 2016. The entire disclosure of the above application is incorporated herein by reference.

FIELD

The present invention is directed to a system and method for the automated preparation of container environments for the automated injection of in-process agents into processes started in the container environment. More specifically, the disclosed system consists in detecting the startup of a new container and on a detected container startup, manipulating the container environment in a way that processes started inside the container environment automatically load and start an in-process agent on startup.

BACKGROUND

Container based virtualization technologies have gained great importance for the management and operation of applications of all types. In contrast to hypervisor based virtualization technologies that are based on specialized hypervisor operating systems that manage and abstract physical hardware to provide virtual computer systems on which conventional operating systems can be executed, container based virtualization uses features provided by an operating system to create isolated execution environments for processes which are called containers. Processes executed in those containers are provided with an execution environment that simulates a separate operating system.

As multiple containers share one operating system, container based virtualization requires less resources than hypervisor bases virtualization. In addition, container based virtualization provides more flexibility in terms of dynamically creating, starting and stopping virtual environments compared to hypervisor based virtualization, as no virtual hardware must be started and no operating system needs to be installed or started.

Their flexibility and efficiency and the level of process isolation they provide make containers an ideal instrument for agile application management, which e.g. allows to automatically launch or shutdown new container environments hosting application processes based on the current load of an application.

Such highly dynamic setups also generate new requirements for application performance monitoring systems. As containers execute application functionality and contribute to the overall performance of an application, visibility to the performance characteristics of application components executed inside containers is required.

Resource usage monitoring systems are available that provide data describing the usage of resources like CPU, memory or network bandwidth by processes executing within containers, but those measures are often not sufficient to evaluate the performance behavior of processes running in the containers.

Agent based performance monitoring systems exist, that use in-process agents that are automatically injected into processes on startup and which then acquire transaction level performance data from those processes. An exemplary description of such a system may be found in U.S. patent application Ser. No. 15/264,949 which is included herein in its entirety by reference. The described system monitors the startup of processes, determines the type of the starting process and injects a process specific in-process agent into the starting process. Although the described injection process works well on the host operating system level, it fails to inject agents into container-isolated processes as the operating system adaptations performed to trigger the automatic injection and the resources required for the agent injection process, like agent libraries, are typically not visible inside a container.

Consequently, a solution is required that enables the automated injection of in-process agents into container-isolated processes.

This section provides background information related to the present disclosure which is not necessarily prior art.

SUMMARY

This section provides a general summary of the disclosure, and is not a comprehensive disclosure of its full scope or all of its features.

The present system and method includes an operating system agent that is installed on a monitored operating system. On installation of the operating system agent, a mechanism is installed or configured on the monitored operating system that notifies the operating system agent about the start of new processes. On detection of a process start, the execution environment of the new starting process is analyzed to determine if the new started process represents a container manager process.

An example for such a container manager process would be a Docker engine or Docker daemon that are part of the Docker container execution environment. For a detailed documentation of the Docker environment, please refer to the Docker online documentation at the web site docs.docker.com/engine/understanding-docker/. Container manager processes provide infrastructure to deploy, start, execute and stop isolated process execution environments in form of containers. Those containers isolate process executions inside and outside a container from reciprocal influences and thus allow concurrent installation and execution of processes with e.g. conflicting configuration requirements on the same operating system.

The identification of a container manager process may be performed based on the name of the executable file of the starting process and the command line of the process. To e.g. identify a Docker daemon process, an identification mechanism could e.g. check if the executable name contains the string "docker", and if the command line indicates the start of a daemon process.

On the detected start of a container manager process, the operating system agent may start a container manager agent process, which establishes a monitoring connection to the container manager process. As an example, the monitoring connection may be established in form of a ptrace connection from the container manager agent process to the container manager process. A ptrace connection allows one process to control the execution of another process and to receive notifications about events that occurred on the other process. Typically, ptrace connections are used by debugger processes to execute debugging target processes in a controlled way.

The container manager agent process may configure the monitoring connection in a way to get notified about events occurred on the container manager process that are indicative for the start of a new container. On detection of a container start by the container manager process, the container manager agent process may identify the process execution configuration of the starting container and manipulate it in a way that the process execution environment of the container performs automated injection of process type specific in-process agents into processes started in the container environment. The in-process agent injection into processes started inside a container manipulated by the container manager agent may be performed according to the teachings of U.S. patent application Ser. No. 15/264,949. As the injected in-process agents create and provide monitoring data describing the resource utilization and performance behavior of the processes they are injected to, those in-process agents may also be referred to as monitoring agents.

Variant embodiments of the present disclosure are directed to the automatic injection of agents into processes executed inside containers on operating systems that do not allow or do not support the manipulation of starting process in the user space of the operating system. As described in U.S. patent application Ser. No. 15/264,949, operating systems may distinguish between a kernel space, in which operating system internal code is and a user space in which user or application specific code is executed e.g. in form of processes. The user space based manipulation of starting processes is typically disabled because it represents a potential security risk. Example operating systems which do not support user space level manipulation of starting processes include variants of the Microsoft Windows® operating system that support the "secure boot" feature. In case no process manipulation in user space is available, a kernel space component e.g. in form of an operating system driver may installed that detects requests to start processes in user space and manipulates those processes start requests in a way that starting processes load and initialize agent code as also described in Ser. No. 15/264,949. This approach works well for processes directly running in the user space of the operating system, but it fails for processes running isolated in containers. Those variant embodiments may detect the preparation of container environments and adapt those container environments to support later kernel mode based injection of agents into processes running in containers based on the adapted container environments.

Some other embodiments of the current disclosure may use techniques and method described herein, like the identification of specific system calls and the analysis of the parameters of those system calls to determine an application execution platform loaded and used by a starting process. Application execution platforms, like the Oracle Java® platform or the Google Go® programming language and execution environment provide an abstraction to the underlying operating system together with utility functionality to simplify development and execution of application based on the application execution platform. Those application execution platforms may also provide their own, platform specific programing language and require a type specific agent to monitor and trace the execution of applications on those platforms. It is required to inject those type specific agents in a starting process as early as possible, at least before the execution of an application on the application execution platform is started. The initialization of those application execution platforms during process startup typically performs sequences of calls to the underlying operating system that are specific to different types of application execution platforms. Those other embodiments of the current disclosure may on startup of a process instrument a set of calls that may be performed by a process during startup and that are indicative for the initialization of application execution platforms. The instrumentation code may register which of those calls are performed during process startup and capture parameters of those calls to create a sequence of calls performed by the process during startup. This recorded call sequence may be compared with known call sequence patterns that uniquely identify specific application execution platforms to determine if the starting process initializes a specific application execution platform and if it does, which type of platform is initialized. An identified application execution platform type may be used to determine a matching type specific agent which may be injected into the process.

Fully automated application performance monitoring based on operating system wide monitoring of starting processes and automated injection of best matching agents into those starting processes (e.g. as described in U.S. patent application Ser. No. 15/264,949) requires a fast detection of specific implementation technologies used by starting processes during process startup time. The detection process either results in injection of a technology specific monitoring agent or, if the detected implementation technology is unsupported or not subject of application performance monitoring, in an unvaried continuation of the process startup.

While the implementation technology detection process is trivial and fast for some implementation technologies, i.e. the Oracle Java® technology can be identified by its command line, the detection process may be non-trivial and time consuming for other implementation technologies.

Non-trivial and therefore time consuming implementation technology detection may involve parsing of binary executable files for specific structural information or, in a worst-case scenario, unstructured lookup of specific patterns in the application binary image used by a starting process. Such implementation technology detection might impact overall process and application startup time in an unacceptable way.

Behavioral driven implementation technology detection avoids or delays non-trivial, time consuming implementation technology detection by observing execution environment service requests, e.g. in form of calls of functions provided by the operating system, during process startup time.

The startup of a process to run an application based on a specific implementation technology has typically two stages. The first stage is an implementation technology specific run time system initialization. The second stage is the startup of application specific functionality. The first stage of the startup typically performs uniform, implementation technology specific and application unspecific patterns of requests to the execution environment.

The uniform execution environment request patterns can be utilized to identify, narrow down, or exclude implementation technologies used by the concrete application executed by the starting process. Thus, non-trivial, time consuming implementation technology detection can be either completely avoided or must only be applied on a small subset of starting processes which match the request pattern.

A request pattern is composed from one or multiple requests of arbitrary type and parameters and the sequence in which the requests are issued against the application execution environment.

The detection significance of a request pattern increases with the number of requests and parameters. Request patterns may also indicate information on version and specific flavor of the implementation technology.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 shows a block diagram of an operating system executing processes, including a container manager process. The container manager process manages and supervises the execution of various containers. The containers provide isolated execution environments for processes.

FIG. 2 provides a block diagram describing the interactions between an operating system agent and a starting container manager process to initiate the monitoring of the starting container manager process.

FIG. 3 contains a flowchart describing detection of a starting container manager process by an operating system agent.

FIG. 4 describes the start of a container manager agent and the creation of a monitoring connection to a container manager process.

FIG. 5 provides a flowchart that describes the container manager agent side processing of trace events received from a container manager process.

FIG. 6 contains a flowchart that describes the manipulation of container configuration data to support automated injection of in-process agents on a detected start of a container environment.

FIG. 7 provides a block diagram of an operating system with an instrumented container manager process that detects requests to create container configurations and that manipulates those container configurations to create containers supporting automatic agent injection in conjunction with a kernel space level agent injection procedure.

FIG. 8 shows a flowchart describing the startup and instrumentation of a container manager process on an operating system that does not support user level manipulation of starting processes.

FIG. 9 provides flowcharts describing the processing of requests to create container configurations and to start containers using previously create container configurations by an instrumented container manager process.

FIG. 10 contains a flowchart describing the start of a container based on a container configuration adapted to support automatic agent instrumentation and the start of processes inside the container including the automatic injection of agents into those processes.

FIG. 11 provides a block diagram of a starting process containing a core agent with a behavior analysis module that monitors and analyzes the calls performed by the process during startup to identify the type of application execution platform executed by the process.

FIG. 12 shows a data structure that may be used to store process interaction patterns that identify the initialization of specific application execution platforms.

FIG. 13 provides a flow chart of the process performed by the behavior analysis module to identify a specific application execution platform.

FIG. 14 shows an exemplary call sequence that is indicative for the start and initialization of an application execution platform or implementation technology of the type Google Go® language runtime.

Corresponding reference numerals indicate corresponding parts throughout the several views of the drawings.

DETAILED DESCRIPTION

Example embodiments will now be described more fully with reference to the accompanying drawings.

The disclosed technologies extend the automated injection of process type specific in-process agents into starting processes to processes started in container environments. Processes running in containers are typically isolated from processes directly running on the operating system hosting the container and the containers also provide an isolated operating system configuration and file system view for the processes executing inside the containers. As a consequence, operating system configuration changes performed by the operating system agent to enable automated in-process agent injection are not visible to processes running in containers. To overcome this, container environments need to be manipulated on startup to support the automated agent injection process.

Referring now to FIG. 1 which provides a conceptual block diagram of an operating system executing a container execution environment as e.g. provided by the Docker container ecosystem. A host operating system 101 manages resources like one or multiple CPUs 106, main memory 107, secondary storage in form of a file system 108 and network connections 109. Those resources are managed by an operating system resource manager 105 which makes them available for executing processes 103. One or more container manager processes 102 may be executing on the operating system and access resources 110 provided by the operating system resource manager 105 to configure and start 111 or to terminate 112 containers 113. A container 113 provides an isolated process execution environment that allows the execution of processes 114 that are isolated from processes executed outside the container. Processes 114 are not aware whether they run inside or outside a container. Processes 114 running inside a container access and request resources from an operating system resource manager 105 of the operating system executing the container. But in contrast to processes 103 running outside a container, processes 114 running inside a container access the operating system resource manager 105 via a container specific resource view 116 that provides container processes restricted access to the resources of the operating system. The resource view may e.g. restrict the usage of CPU 106, main memory 107 and network connections 109 by container processes, it may hide portions of the file system 108 from container processes, or provide container processes a different view to the file system 108 of the operating system.

Operating systems like Linux provide process isolation mechanisms like namespaces that provide isolated naming schemes for e.g. process or port identifiers for processes that are executed inside containers. This way, e.g. a process with an identifier "X" executing in a container may coexist with another process running on the same operating system with the same identifier outside the container. Similar to this, processes inside a container may establish a network connection end point identified by a specific port number that is already used by a process outside the container. Those container local identifiers are mapped to global identifiers that are managed on the operation system level and allow access to container executed processes from outside the container. Linux also provides a namespace mechanism for file system mounts that allows the creation of container specific file system mount layouts that differ from the mount layout of the hosting operating system.

A mechanism called cgroups available on Linux operating systems allows to define container specific restrictions of the usage of resources like CPUs, main memory or network bandwidth.

Container management and execution ecosystems like Docker use those operating system features to provide automated deployment and execution of container environments. Besides a container image repository that provides prebuild container images that are ready for execution, Docker provides a Docker daemon or Docker Engine process that receives and executes those container images and conceptually works like the container manager processes 102 described herein.

A block diagram that conceptually describes the manipulation of container manager processes 102 to enable automated in-process agent injection inside containers is shown in FIG. 2.

An operating system agent process 201 runs on an operating system 101, monitors the start of processes on the operating system and injects process type specific in-process agents into starting processes. Mechanisms as described in U.S. patent application Ser. No. 15/264,949 may be used for the agent injection process. The operating system agent also detects the startup 203 of container manager processes 102. To identify starting container manager processes, the operating system agent 201 may use the name of the executable of a starting process (e.g. in a Docker environment, the executable name of a container manager process may contain the string "docker"), the command line of the starting process or specific libraries loaded by the starting process. After the operating system agent has identified a starting process as container manager process 102, it starts 204 a container manager agent process 202 and creates a monitoring connection from the container manager agent process to the currently starting container manager process 102.

The monitoring connection between container manager agent process 202 and the container manager process 102 may be established in form of a ptrace connection. A ptrace connection allows a monitoring process (i.e. the container manager agent process 202) to control and inspect another process (i.e. the container manager process). In addition, a ptrace monitoring connection allows the monitoring process the monitoring and inspection of system calls performed by a monitored process. A system call represents an interaction of a running process with the operating system to e.g. request system memory, create, access or delete a file on a file system or to mount or unmount a file system.

The container manager agent process may analyze the monitoring data describing those system calls and identify system calls that are characteristic for the start of a new container 113 by the container manager process. Such characteristic system calls may include but are not limited to "pivot_root" calls indicating the change of the root file system for a specific process, or "mount" calls with call parameters indicating the move of an existing file system mount. Those calls are specific for the setup of a container specific file system view. The container manager agent process 202 detects 205 such calls which indicate the preparation of a container environment for a new container that is going to start. On detection of such calls, the container manager agent process manipulates the container environment to enable automated in-process agent injection into processes executed inside the starting container. For containers running on a Linux operating system, the container manager agent process may e.g. adapt the file system mounts of the new container in a way that all libraries and other resources required for the injection of in-process agents are accessible from inside the container. The container manager agent may also adapt the container specific operating system settings that control the startup of processes inside the container to inject in-process agents into all processes staring inside the container. For containers running on a Linux operating system, this may include creating or adapting a "/etc/Id.so.preaload" file that specifies libraries that are automatically loaded into all starting process before they load other, process specific libraries. Per convention, such a "/etc/Id.so.preload" file contains a list of file names identifying libraries that should be loaded by all starting processes before they start loading process specific libraries. The container manager agent may insert entries to the "/etc/Id.so.preload" file identifying libraries containing the functionality of in-process agents, which are then automatically loaded by all processes starting inside the container.

The container manager agent process 202 creates an "Id.so.preload" file in the "/etc/" folder of the file system of the starting container containing file names identifying the agent process libraries that should be loaded by starting processes.

The file system of a container image typically contains no "/etc/Id.so.preaload". In case the container environment already contains an "Id.so.preload" file, the container manager agent process 202 may adapt the existing "Id.so.preload" file in a way that it contains in addition to existing library file names also the file names of the agent libraries required for the automated in-process agent injection.

When the new container 113 is running and processes 114 are started inside it, the resources and configuration required for the automated injection of in-process agents are already in place and all processes inside the container are executed with an injected in-project agent 206. The injected in-process agents may retrieve resource usage and performance measurement data describing the processes they are deployed to and they may monitor and trace the execution of transactions executed by those processes. Transaction monitoring may be based on instrumentation techniques that e.g. use on-the fly bytecode manipulation to enrich existing application code with sensor code that detects and reports the execution of specific code portion by a transaction. The in-process agent 206 may also be referred to as monitoring agent.

The retrieved measurement and tracing data may be tagged with correlation data allowing to identify transaction executions corresponding to the measurements. Afterwards, the agents may send the tagged measurement data to a correlation server that incrementally creates end-to-end transaction trace data describing execution and performance details of individual transactions out of the tagged measurement data retrieved from different agents. For agents deployed to processes running in a container environment, the correlation data may in addition contain data allowing to identify the container instance running the process, like a container id, or data allowing to identify the type of the container instance, like the name of the container image used by the container instance.

Referring now to FIG. 3 which provides a flow chart describing the determination whether a new started process is a container manager process. The process described by the flowchart may be executed by the operating system agent and starts with step 301 either cyclically, or when the operating system agent detected the startup of a new process on the operating system it is deployed to. Subsequent step 302 analyzes attributes of the starting process and its execution context to determine if the starting process is a container manager process 102. Step 302 may e.g. examine the name of the executable of the starting process, its command line or names, versions and types of libraries loaded by the starting process to determine if it represents a container manager process 102. Following decision step 303 continues with step 306 which ends the process in case step 302 determines that the starting process is no container manager process. Otherwise, step 304 is executed, in which the process identification data (PID) of the starting process is determined. The process identification data may later be used by a container manager agent process 202 to establish a monitoring connection to the starting process. Subsequent step 305 launches a container manager agent process 202 and configures it with the process identification data of the starting container manager process. As an example, the container manger agent process may be started with a command line that contains the process identification data of the container manager process. During startup, the container manager agent may parse the command line to retrieve the process identification data of the container manager process. The process afterwards ends with step 306. The initialization of the container manager agent process 202, including the establishment and operation of a monitoring connection to the container manager process 102, is described in following FIG. 4. In alternative embodiments, the process described in FIG. 2 may not be executed by the operating system agent but by a generic, process type independent agent that is injected into all processes on startup via the automated agent injection mechanism installed by the operating system agent.

Advancing now to FIG. 4 which shows a flowchart that describes the startup of a container manager agent process. The process starts with step 401 when a new container manager agent process 202 is started and continues with step 402 in which the started process fetches required configuration data, like e.g. the file system position of in-process agent binaries and of configuration data for the agents, and the process identification data of the container manager process that should be monitored by the starting container manager agent process. The configuration data may be provided to the starting container manager agent process as part of the command line used to start the container manager agent process. Following step 403 establishes a monitoring connection to the container manager process. The monitoring connection may be configured to provide notifications about all trace events that occur on all threads of the container manager process and all child processes of the container manager process. In a Linux/Docker environment, this monitoring connection may be established with a ptrace call with parameters indicating a request to attach the caller as tracing process to the container manager process. Those ptrace parameters could e.g. contain a PTRACE_ATTACH request type and the process identifier of the container manager process. A subsequent ptrace call containing a PTRACE_SETOPTIONS request may be used to specify events on the monitored container management process that should be notified to the container manager agent process in form of trace events. Example events that should be notified are start or termination of a child process, termination of the container manager process, or system calls performed by the container manager process or one of its child processes.

After the monitoring connection was established in step 403, the process continues to step 404 in which it waits for the next trace event from the container manager process or one of its child processes. In a Linux/Docker based environment, waiting for the next trace event from the container manager process or its child processes could be performed by the system call "waitpid" that waits until the next trace event occurred on one of the monitored processes and then provides data describing the event and data allowing to identify the process or thread on which the event occurred. Typically, the monitored process (i.e. the container manager process) is stopped before a trace event is sent to the monitoring process (i.e. container manager agent process) and the "waitpid" system call returns to provide the trace event to the monitoring process. After the monitoring process has processed the received trace event, (i.e. steps 405 to 410 and steps described in FIG. 5), the monitoring process may resume the monitored process. As an example, the monitoring process may perform a ptrace call with a PTRACE_SYSCALL request to resume the monitored process until the next system call.

In case a new trace event is received, step 405 is executed which analyzes the received trace event to determine if the trace event indicates the start of a child process of the container manager process that is not involved in the creation of the file system view of a new container, as only activities involved in the creation of a new file system view of a new container need to be monitored and manipulated to prepare a container for automated in-process agent injection. This analysis may e.g. be performed by first checking if the trace event indicates a system call. On Linux/Docker based systems, the data received from the previous "waitpid" call may be used to determine if the received trace event indicates a system call. See e.g. the "WSTOPSIG" function which receives status data describing a trace event and which provides a corresponding signal number that allows to determine the type of activity performed on the traced process that caused the received trace event. This signal number may also be used to identify trace events describing system calls.

In case the received trace event indicates a system call, a further check may be performed to determine if the type of the system call is related to the start of a new child process by the current process. In a Linux/Docker environment, this would e.g. be an "execve" system call which receives the name of an executable file as a parameter and starts the execution of the executable file in a new process. In case both previous checks indicate a system call to start a new child process, step 405 may further examine the parameters of the system call to retrieve the file name of the executable that will be started. Subsequent step 406 may decide based on the file name of the executable if the monitoring connection to the new started child process should be closed. A monitoring connection may use resources on the monitored process and may affect the performance of the monitored process. Consequently, it is desired to identify child processes that are not required by the container manager agent to detect and modify preparations for the start of a new container and to close the monitoring connection to those child processes. Typically, either the container manager process itself or container manager specific child processes prepare the environment for a new container. Those container manager specific child processes may be identified by the name of the executable used by those container manager specific child processes or by the command line that was used to start those processes. All other child processes created by the container manager process are not required by the container manager agent to detect and modify preparations for the start of a new container. Consequently, the monitoring connection to those child processes are closed.

In case the monitoring connection to the child process should be closed, step 407 is executed which terminates the monitoring connection to the child process (see e.g. PTRACE_DETACH for a Linux/Docker environment), and the process continues with step 404 to wait for the next trace event.

For Linux/Docker environments, child processes of a container manager may be identified as required by the container manager agent if the executable name or the command line of a child process contains the string "dockerinit" or "/docker". For Linux/Docker environments, the monitoring connection may in addition be closed for child processes that are not involved in the preparation of the file system view of a new container environment.

Examples for such additional child processes for which the monitoring connection is closed are calls to "netns-create" which create a network namespace for a new container or "docker-untar" which populates an already existing container file system view with container specific files.

In case steps 405 and 406 determine that the trace event does not indicate the start of a child process that should not be monitored, the process continues with step 408 which determines if the trace event indicates a system call. In case the trace event indicates a system call, the process continues with step 409 which further analyzes type and parameters of the system call to determine if the system call is related to the preparations of the file system view of a starting container. As an example for a Linux/Docker environment, system calls related to the preparation of the file system of a starting container include "pivot_root" system calls or "mount" system calls that move an existing mount point. Those system calls may be used to change the root file system that is visible for processes running in a container environment. If a system call related to the preparations of the file system view of a starting container is identified, the file system view of the new container may be changed by step 409 to support the automated injection of in-process agents. A detailed description of the activities performed by step 409 can be found in FIG. 5. In other types of execution environments, one skilled in the art will readily recognize other techniques may be employed to detect the creation of container.

If step 408 determines that the trace event indicates no system call, step 410 is executed which checks if the trace event indicates the termination of the container manager process. In case the container manager process 102 has terminated, also the corresponding container manager agent process 202 is terminated in step 411 and the process ends with step 412. Otherwise, the process continues with step 404 and waits for the next trace event.

The processing performed to determine whether a system call reported by a trace event indicates preparations of a file system view for a starting container and to identify the configuration data of the starting container is depicted in FIG. 5. The process starts with step 501 when the container manager agent received a trace event that indicates a system call to be performed by the container manager process or one of its child processes (FIG. 4, step 409). Following step 502 determines the process identification data of the process on which the system call reported by the trace event was performed. On a Linux/Docker based system, this may be performed with the system call "waitpid" that waits for the next trace event on a traced process and provides data describing the trace event and the PID of the process on which the trace event occurred. Afterwards, step 503 fetches current register values from the process from which the trace event was received to further identify the type of the performed system call in step 504. Fetching the register values may on a Linux/Docker based system be performed with a ptrace "PTRACE_GETREGS" call for the process from which the trace event was received. After the register values have been retrieved, the value of a first register may be evaluated that provides the type of system call (e.g. register "orig_rax"). The retrieved system call type may be evaluated to determine if the reported system call indicates preparations of the file system view of a new starting container. System calls indicating the preparations of the file system view of a starting container may contain but are not limited to "pivot_root" system calls, or "mount" system calls with call parameters indicating the move of an existing filesystem mount. To determine if a "mount" system call indicates the move of an existing mount point, the value of another register (e.g. register "r10") that contains a system call parameter value may be evaluated. Those system calls are used to setup an isolated file system view for a new starting container.

If step 505 determines that the system call does not indicate the start of a new container, the process ends with step 509. Otherwise, step 506 will be executed which extracts the path to the directory that should be used as root file system of the new container from register values describing the above identified system call.

The above described system calls require a parameter that specifies the absolute path to an existing directory in the file system of the hosting operating system which is mapped to the root file system of the container that is going to be started. This absolute path may be retrieved from a register providing a parameter for one of the above identified system calls (e.g. register "rdi" for both the "pivot_root" and the "mount" system call).

Following step 507 uses the extracted register value describing the absolute path to identify and locate the directory representing the root file system of the starting container in the file system of the hosting operating system. In addition, step 507 uses a combination of the absolute path and the process identification data representing the starting container to identify and analyze the configuration data of the starting container. In a Linux/Docker environment, the configuration data of the starting container may consist in a "config.json" file contained in a folder named according to the process identification data of the starting container. This configuration data may contain data describing the container, like an image name, identifying the container image that is used for the starting container and a container identifier or container name identifying the instance of the starting container. Typically, this configuration data is not accessible from inside the container.

Step 507 extracts this data to make it accessible for in-process agents later operating in the context of the starting container. This way, in-process agents are able to add data identifying and describing the container in which they operate to monitoring data they send e.g. to a container external receiver of the monitoring data. The additional container identification and description data attached to monitoring data allows a receiver of the monitoring data to identify the container context inside which activities described by the monitoring data occurred.

A description of the storage of the extracted container identification and description data in a location that is accessible for in-process agents that are later executed in the starting container can be found in the subsequent description of FIG. 6.

Subsequent step 508 modifies the content of the directory representing the root file system of the starting container to support automated injection of in-process agents into processes starting inside the container. Those manipulations may contain but are not limited to making binary libraries containing in-process agent functionality and files container in-process agent configuration data available inside the container and adapting the process start configuration of the container to automatically load libraries containing in-process agent functionality into every starting process. A detailed description of this manipulations is available in FIG. 6. The process afterwards terminates with step 509.

The process of manipulating the content of the directory that serves as the root file system of a starting container to support the automated injection of in-process agents into processes started in the container is shown in FIG. 6.

The process starts with step 601 when the container manager process agent detects that a received trace event indicates preparations to create the file system view of a new container (e.g. step 504 of process depicted in FIG. 5 detected that a received trace event reports the execution of a system call that is only used by a container manager process to set the root file system for a new container). Subsequent step 602 switches the container manager agent process to the context of the starting process. This allows the container manager agent process to examine the resources that will be available for the subsequently started container. More specifically and for a Linux/Docker based environment, step 602 may switch to the mount namespace of the starting container to view the portions of the host file system that will be available for the starting container. Following step 603 checks if the starting container has access to basic functionality required for the automated loading of in-process agents. An example of such basic functionality is the functionality to dynamically load libraries to processes during runtime. For Linux/Docker environments, this may contain checking if the starting container has access to a variant of the library "/lib/ld-linux.so", as this library provides the functionality to dynamically load libraries. In case decision step 604 determines that access to this basic functionality is not available, the process ends with step 608.

Otherwise, the process continues with step 605 which updates the file system view of the starting container by making libraries containing in-process agent functionality and configuration data required by the in-process agents available in the container. Step 605 may either mount directories containing those libraries and configuration data that exist in the file system of the host operating system to a directory of the file system that will be available for the new container, or it may copy those libraries and configuration data to the file system of the container.

Subsequent step 606 manipulates the process start configuration of the starting container to automatically load libraries containing the in-process agent functionality into every started process. In a Linux/Docker environment, step 606 may create a "/etc/ld.so.preload" file in the file system of the starting container that contains entries to in-process agent libraries that should be injected into each starting process. On Linux environment, an "/etc/ld.so.preload" file may be used to specify libraries that should be loaded instead of standard libraries or that should be loaded in addition to standard or process specific libraries. Such an "ld.so.preload" file contains a list of library names specifying libraries that should be loaded on start of a process before any other libraries are loaded.

Following step 607 stores the container identification and description data extracted from the container configuration data retrieved in step 507 of the process described in FIG. 5 in the file system of the container in a way that it is accessible to in-process agents injected into processes running in the container. As an example, step 607 may create a file "container.info" in the root directory of the file system of the container and store the container identification and description data in this file. In-process agents deployed to processes later running in the container my open this "container.info" file and read the container identification and description data. A container simulates an individual operating system for processes running inside the container and does not allow processes running inside the container to access resources that are located outside of the container. By storing the container identification and description data in the file system of the container, in-process agents later running in the container can access this identification and description data and use it to tag created monitoring and tracing data. Afterwards, the process ends with step 608.

After the manipulations of the container context as described in FIG. 6 are finished, preparation and startup of the container continues, and processes to perform container specific functionality may be started inside the container. In-process agents will automatically be injected into those processes on startup. Those in-process agents may monitor the processes they are injected to and send created monitoring data to an external monitoring server that may further process, correlate, store and visualize the monitoring data. Some variants of in-process agents may instrument code of processes they are deployed to with sensor code. Instrumentation techniques may be used by the in-process agents as described in U.S. Pat. No. 8,402,443 entitled "Method and System for Automated Analysis of the Performance of Remote Method Invocations in Multi-Tier Applications using Bytecode Instrumentation" or in U.S. Pat. No. 8,464, 225 "Method and System for Adaptive Gerneric Code Instrumentation Using Run-Time or Load-Time Generated Inheritance Information for Diagnosis and Monitoring Application Performance and Failure" which are both incorporated herein in their entirety by reference.

The sensor code registers and reports the start and end of the execution portions of code by the monitored process, like the start and end of method executions. The reporting data created by the sensor code may contain next to measurement data like execution duration, CPU usage or memory usage, correlation data that allows an external monitoring server to reconstruct method call sequence and nesting levels and thread switches. The external monitoring server may create end-to-end transaction trace data describing individual transaction executions. The described transactions may entirely or partially be executed by processes running inside containers. The creation of the correlation data and its processing by an external monitoring server to create end-to-end transaction trace data may be performed according to the teaching of U.S. Pat. No. 8,234,631 entitled "Method and System for Tracing Individual Transactions at the Granularity Level of Method Calls Throughout Distributed Heterogeneous Applications without Source Code Modifications" which is incorporated in its entirety herein by reference.

Other variants of in-process agents may in addition generate topology data describing the vertical relationships between monitored processes running inside a container and the container manager managing the container or the monitored containerized processes and host operating system running both the container manager and the monitored containerized processes. Those variants may also identify services provided and used by the processes and generate topology data describing the horizontal service usage relationships between different containerized and/or not containerized processes. Creation and processing of the topology data may be performed according to the teachings of U.S. patent application Ser. No. 14/879,183 which is incorporated herein in its entirety by reference.

The monitoring data provided by in-process agents running in a container environment may contain container identification and description data as described before. The container identification and description data may be used to process, correlate, store and visualize monitoring data from different containers separately. The container identification and description data may in addition be used for the visualization of monitoring data describing the performance of processes running inside containers to provide additional context information about those processes by in addition displaying data describing the container inside which they are executed. In some embodiments, the container identification data may also include data identifying the container manager process running the container and the host computer system executing the container manager process.

Above describes a mechanism to detect the start of new containers and to manipulate the environment of those containers to support automated in-process agent injection inside the container that does not require an in-process agent inside a container manager process and that also does not need to instrument container manager process code. As such an approach does not place instrumentation code into code of the container manager process, it does not depend on the existence of specific code structures inside the container manager process and is thus independent of code or architecture changes inside the container manager process. It relies on basic system calls that are required to initialize and start a container and that need to be performed by any type or version of container manager process to start a new container.

An alternative embodiment however, that accepts this dependency on the inner code structures of a container manager process may use an in-process and instrumentation based approach. In such an alternative embodiment, an in-process agent specialized in the monitoring of container manager processes may be injected into a starting container manager process. The specialized in-process agent may identify and instrument the code of the container manager process specific to the setup of new container environments. The instrumentation may adapt the code that sets up new container environments in a way that it creates container environments capable for automated in-process agent injection by performing modifications of the file system view of the staring container that are similar to the modifications described in FIG. 6.

Referring now to FIG. 7 which provides a block diagram of an operating system containing an automated agent injection procedure that works on the kernel level of the operating system in combination with an instrumented container manager process that is adapted to create container environments supporting automated agent injection into processes running in containers created by the instrumented container manager process. An operating system 701 typically maintains a kernel space 703 execution environment to execute basic, system specific code, like code that manages the access to persistent storage volumes managed by the operating system, the access to networking resources, the management of processes running in user space or the execution of driver code and a user space 704 execution environment to execute user or application specific code in form of processes.

A container manager process 704 runs in the user space 702 of the operating system and a container manager agent 710 is injected into the container manager process. The container manager agent 710 was injected into the container manager process during the process start. The container manager agent 710 identified and modified code of the container manager process that interacts with the container management interface 705 of the operating system to create container configurations that may later be used to configure starting containers. The identified code may be modified in a way that parameters of incoming requests to prepare container configurations are analyzed and adapted in a way that the adapted parameter describe container configurations supporting the automated injection of agents into processes running in containers that are based on this container configurations.

More specifically, the container manager agent may identify code performing a call to a "HcsCreateComputeSystem" function being provided by a library "vmcompute.dll". The library "vmcompute.dll" represents the container management interface 705 on some variants of the Microsoft Windows® operating system. The container manager agent may further modify code performing calls of the "HcsCreateComputeSystem" function by extracting and analyzing the call parameter describing the container configuration (e.g. parameter "configuration" of type string), modifying the call parameter by adding directory mapping configurations that make directories of the operating system containing agent binaries accessible from inside the container (e.g. by adding "HostPath/ContainerPath" entries to the "MappedDirectories" section of the call parameter) and performing the "HcsCreateComputeSystem" call with the modified call parameter. The "HcsCreateComputeSystem" call instructs the container management subsystem 706 to create a container configuration and store it in a container repository 707 for later use. On receipt of container preparation requests 708, the container manager process 704 afterwards instructs the container management subsystem 706 to create container configurations that are capable for automatic agent injection into processes running inside the container.

The container manager process 704 may also receive requests to start containers 709, those requests may contain data to identify a specific container configuration stored in the container repository that should be used to configure the environment of the to be started container.

Such a container start request 709 results in a call to the container management interface to start a container using a specific container configuration (e.g. a call to the function "HcsStartComputeSystem" of the library "vmcompute.dll" on Windows operating systems). This causes the container management subsystem 706 to fetch the container configuration specified by the request and to start 712 a container with a resource view 714 configured according to the fetched container configuration. The resource view 714 of a container defines and restricts the access of processes running inside a container to resources of the operating system running the container, like hard drives or directories on those hard drives or network interfaces.

The container configuration may also contain directives to start one or more processes inside the container. Those process start directives create one or more process start requests 715 which are directed to the process management API 716 of the operating system. The process management API forwards received process start requests 717 to the process manager 718 of the operating system which notifies 719 a process starter 720 to initiate the start of a process inside the container 713. A core agent injection procedure 721 is installed to be executed in the kernel space of the operating system, e.g. in form of a device driver. The core agent injection procedure gets notified about a requested process start and manipulates 722 the process start request in a way that the process tries to load and start a core agent during startup. More specifically, the core agent injection procedure may detect when executable code for the starting process is copied from a file containing the executable code of the process to the main memory of the computer system for later execution and may further modify portions of the copy of the executable code in the main memory of the computer system by adding code that loads and initializes core agent binaries during the subsequent start of the process. The core agent injection procedure may be installed on the operating system during preparation of the operating system for monitoring and automated agent injection into starting processes, e.g. during the installation of an operating system agent process on the operating system. Installation and functionality of the core agent injection procedure may follow the teachings of U.S. patent application Ser. No. 15/264,949, a detailed description of both can be found there. Some variants of container management interfaces may provide functions that allow a caller to define a container configuration and request the immediate start of a container using the provided container configuration. In such container management interface variants, calls to functions that immediately start a container with provided container configuration data may be manipulated in the same way as calls that only provide container configuration data for the later start of a container using the provided container configuration.

The process starter 720 starts 723 a container isolated process 724 in the container 713 using the process start directives manipulated by the core agent injection procedure that cause the starting process to try to load and initialize a core agent. The starting container isolated process 724 tries to load agent binaries using the resources available within the container according to the resource view. As the resource view was created using a container configuration adapted to automatic agent injection, the agent binary repository 727, e.g. in form of a directory on a hard disk of the operating system containing binary files with executable agent code, is visible inside the container and the starting process can successfully load and initialize the core agent. The core agent may further determine the type of the starting process and inject a process type specific agent into the starting process 724. The agent 728 depicted in FIG. 7 incorporates both the core agent and the type specific agent. Both core agent and type specific agent monitor activities performed by the process they are injected to and may provide monitoring data describing those activities to an external monitoring server, therefore both agent types may also be referred to as monitoring agent. The core agent only uses low-level functionality that is available in any process started on the operating system, therefore the core agent can also be injected into any process. The type specific agent uses functionality specific to an application platform type like e.g. the Oracle Java® JVM platform and may only be injected into processes using this specific application platform. As a type specific agent uses application platform specific functionality, it may also provide monitoring data that is application platform specific. This specific monitoring data is often more meaningful than the low-level monitoring data provided by the core agent.

Referring now to FIG. 8 which provides a flowchart describing the startup and instrumentation of a container manager process 704. The process starts with step 801 when the process management API 716 of the operating system 701 receives a request to start a new container manager process. It is noteworthy that this is typically no specific request dedicated to the starting of container manager processes, but a generic request to start a process to execute specific code in the user mode of the operating system, the specific code to execute may be determined by a name of a binary file containing an executable form of the specific code. In the case of step 801, this request specifies executable binaries containing container manager functionality.

Following step 802 may be executed by the core agent injection procedure 721 installed according to the teachings of U.S. patent application Ser. No. 15/264,949, which manipulates the process start request to cause the process that is later started to load and start a core agent. As described in Ser. No. 15/264,949, a core agent only contains functionality that is independent of any special process type (e.g. processes running Oracle Java® virtual machines, or processes interacting with a Microsoft Common Language Runtime® interface). Therefore, core agents may be injected into any starting process. During process startup, the core agent may identify the type of the starting process and then inject a process type specific agent into the starting process.

Step 803 starts the container manager process in user space and the starting process loads and initiates the core agent. Executable binary files containing the core agent functionality may be loaded from an agent binary repository 727 which may e.g. be implemented as folder on a drive volume of the operating system containing binary executable files that provide agent functionality.

Following step 804 is executed by the core agent injected into the starting process and uses properties of the starting process, like the command line of the process, libraries loaded by the starting process or patterns in the binary executable file of the starting process to determine if the starting process is a container manager process, and in case the starting process is identified as container manager process, inject and start a container manager agent 710 in the container manager process.

The injected container manager agent 710 may in following step 805 identify code of the container manager process that performs calls to the container management interface 705 to transfer container configuration data to the container management subsystem 706 for later or immediate start of containers. The identified code may be manipulated to enrich existing container configuration with additional configuration data required to support automated agent injection inside the container environment described by the container configuration. As described earlier, this additional configuration data may contain but is not limited to configuration data providing the access of agent binaries from inside the container. The process then ends with step 806.

In some embodiments of the current disclosure, the identification and manipulation of code that performs calls to the container management interface 705 to transfer container configuration data to the container management subsystem 706 may be performed by the core agent in step 803 and steps 804 and 805 may be skipped. Those variants modify calls to the container management interface regardless if the processes performing those calls are identified as container manager processes.

Coming now to FIG. 9 which provides flowcharts that describe the processing of exemplary container management related requests by an instrumented container manager process. FIG. 9a describes the processing of a request to prepare a new container that contains container configuration data. The process starts with step 901 when the instrumented container manager process receives a container preparation request. Following step 902 executes the code of the container manager process to process the incoming request that was manipulated by the process described in FIG. 8 to enrich incoming container configuration with configuration data required to support automated agent injection inside the container. Subsequent step 903 forwards the container preparation request with the adapted container configuration to the container management subsystem 703 and following step 904 which may be executed by the container management subsystem in the kernel space of the operating system stores the received container configuration data in a container repository 707 for subsequent container executions. The process then ends with step 906.

Referring now to FIG. 9b which provides a flowchart describing the processing of a container start request by an instrumented container manager process. The type of container start request described here causes the container manager process to start the execution of a container using a container configuration already known by the container management subsystem 706. The process starts with step 910 when the container manager process receives a container start request and continues with step 911 in which the container manager process forward the start request to the container management subsystem. Subsequent step 912 which is executed by the container management subsystem fetches the container configuration identified by the container start request (e.g. by a configuration identifier) from the container repository and following step 913 creates a container according to the fetched container configuration, e.g. by creating a resource view 714 for the container that restricts and configures access to resources (including access to resources required for automated agent injection inside the container) of the host operating system according to the container configuration. The created container is started by step 913 and the process ends with step 914.

Referring now to FIG. 10 which provides a flowchart that describes the start of a container and the following start of processes inside the container including the automated injection of agents into those processes.

The process starts with step 1001 when the container management subsystem initiates the start of a container. Subsequent step 1002 creates and starts a container environment including the resource view of the container that manages the accessibility of resources of the host operating system from inside the container. The container environment simulates a separate operating system for processes running inside the container and provides most of the interfaces and services of a real operating system, but the access to resources e.g. in form of file system or network access and CPU usage may be restricted.

Following step 1003 starts processes inside the container according to the configuration of the container. Typically, container configurations not only contain configuration data defining the execution context of a container, but also a directive, e.g. in form of one or command lines defining one or more processes that should be executed within the container environment.

The process start requests to start the container isolated processes are received by the process management API 716 of the host operating system and forwarded to the process starter 720 via the process manager of the guest operating system 701. The core agent injection procedure 721 installed to the process starter following the teachings of U.S. patent Ser. No. 15/264,949 also receives the process start request and executes step 1004 to adapt the process start request in a way that the starting process loads and initializes a core agent during startup.

Some operating systems versions, like e.g. the Microsoft Windows® 2016 Server operating system provide next to the host operating specific operating system environment, an alternative environment that simulates another type of operating system. The Microsoft Windows® 2016 Server operating system contains the "Windows Subsystem for Linux" or "WLS" that provides Linux conformant kernel interfaces. The "Windows Subsystem for Linux" enables the provision of a Linux operating system environment that is based on Windows kernel functionality and that allows to execute Linux executables. Although it is currently not possible to execute containers using the "WLS" on Windows host operating systems, there is no technical reason preventing future versions of the Windows operating system to extend the corresponding container management subsystem of Windows operating systems to support also "WLS" based containers. In case such heterogeneous host/container operating system setups become possible in the future, step 1004 would, before adapting the received process start request, determine the operating system environment (e.g. Windows or Linux) in which the process is going to start and select a manipulation of the process start request that is appropriate for the operating system environment and that also changes the process start request to load and start the version of the core agent binaries that matches the operating system environment of the starting container. In such situations also step 902 of the process described in FIG. 9a needs to be adapted to either make agent binaries for all supported container operating systems available in the container environment, or to analyze the received container configuration, determine the container operating system and make only those agent binaries matching the container operating system available inside the container.

Another variant to support heterogeneous container setups, with a host operating system e.g. of type Microsoft Windows® and containers executing on the host e.g. using the "Windows Subsystem for Linux" to simulate a Linux operating system may persistently prepare the persist the "Windows Subsystem for Linux" of the host operating system, e.g. during the installation of an operating system agent to support automatic agent injection into processes running on the "Windows Subsystem for Linux". Such preparations would include the installation of agent binaries on a file system location that is accessible from within the "Windows Subsystem for Linux", and to adapt the process start conditions of the "Windows Subsystem for Linux" that starting processes load and start agents. This may be performed by creating or manipulating a "/etc/Id.so.preaload" file as described earlier. Containers later using this prepared "Windows Subsystem for Linux" would then perform automated injection of agents into starting processes.

Yet another variant for heterogeneous container setups could in step 902 of the process described in FIG. 9a additionally analyze the configuration data provided with container preparation requests to determine the type of operating system requested for the container and in case the operating system requested for the container supports user space process manipulation (e.g. the "Windows Subsystem for Linux"), adapt the received container configuration to support user space agent injection, e.g. by changing the configuration to map a "Id.so.preaload" file containing directives to load the agent binaries to the location "/etc/Id.so.preaload". Other variants may change the container configuration in a way that containers using the configuration provide an "LD_PRELOAD" environment variable which has a similar functionality as the file "/etc/Id.so.preaload".

After step 1004 manipulated the process start request, step 1005 follows in which the process 724 is started in the container environment and loads core agent binaries from the container visible agent binary repository 727 and initializes and starts the core agent functionality inside the starting process.

Following step 1006 which is executed by the core agent identifies the type of the starting process and loads and starts a process type specific agent. The process then ends with step 1007.

Referring now to FIG. 11 which shows a block diagram of a starting process that initializes a specific application execution platform (e.g. Java, PHP, Go runtime environment) for the later loading and execution of an application that is based on the application execution platform. An application execution platforms may also be referred to as technology type.

A core agent 1105 including a behavior analysis module 1108 is already injected into the process, and the process uses an execution environment interface 1109 (e.g. system calls on Linux/Unix operating system or specific dynamically loadable and linkable libraries like a kernel32.dll on Microsoft Windows® operating systems) to interact 1110 with execution environment services 1111 provided by the operating system running the process. The core agent 1105 instrumented a subset of the function calls provided by the execution environment interface 1109 that are called in a specific sequence and with specific parameter values during the initialization of specific types of application execution platform. The sequence of those calls together with their specific parameters may in some cases uniquely identify the type of the application execution platform that gets initialized and in some other cases reduce the number of possible application execution platform types. The instrumentation performed by the core agent recognizes the execution of such calls and captures parameter values used for those executions. The monitoring data created by this instrumentation that describes interactions 1106 of the application execution platform 1104 with the execution environment interface 1109 is forwarded 1107 to the behavior analysis module 1108 for analysis. After the application execution platform is initialized, an application 1102 may be loaded and executed which interacts 1103 with the platform 1104.

Referring now to FIG. 12 which shows a data record that may be used to store process interaction patterns that identify application execution platforms. An interaction pattern record 1201 may contain but is not limited to a function call list 1202 that specifies a sequence of calls together with corresponding call parameters that are specific for one or more technology types and a technology type list 1211 containing data that identifies those technology types. A function call list 1202 may contain one or more function call records 1203, each function call record describing a specific function call and its position in a sequence of expected function calls. The detection significance of an interaction pattern record increases with the number of calls and parameters specified in the pattern record, as the probability that a process which is not using a specific technology type creates a call sequence that by chance matches the call pattern for the specific technology type decreases.

A function call record 1203 may contain but is not limited to a call sequence number 1204 identifying the position of a specific call in a sequence of expected calls, a function name 1205 identifying a specific function and a parameter list, identifying function parameters of the function call by their type and value. It is noteworthy that parameter types and sequences of functions may in addition to function names be used to identify specific functions on systems supporting function or operator overloading. Those systems allow an interface to define multiple functions with the same name that only differ in their parameter list. The function name 1205 may in addition contain the name of a library providing the function to provide a name that uniquely identifies the function.

A parameter record 1207 may contain but is not limited to a parameter sequence number 1208 identifying the position of the parameter within a list of parameters of the function, a parameter type 1209 determining the type of the parameter (i.e. single character, sequence of character or string, integer value, floating point value etc.) and a parameter value 1210. Parameter values 1210 specify values for parameters of specific function calls that are indicative for specific technology types. In some embodiments, parameter records 1207 may also contain a parameter name.

The technology type list 1211 links a specific function call pattern defined by a function call list with one or more technology types that are identified by the call pattern. A technology type list 1211 may contain one or more technology type records 1212, each of those technology type records identifies a specific technology type e.g. by its name (Java, Go, PHP etc.). A technology type 1212 also indicates a technology type specific agent. Some variants of technology types may contain additional data like a specific version of technology type.

Referring now to FIG. 13 which provides a flowchart of the process performed by the behavior analysis module 1108 to determine the technology type of a starting process. The process starts with step 1301 after the core agent 1105 injected into a starting process has finished a trivial technology detection, e.g. by analyzing the executable name or the command line of the starting process or other structural, small and easy to analyze data describing the starting process that can be used to determine a technology type, and this trivial technology detection was inconclusive. Subsequent step 1302 instruments a subset of functions provided by the execution environment interface. Functions are selected for instrumented that are themselves indicative for the initialization of one or more specific technology types (i.e. are only performed by one or a small subset of technology types during initialization) or that are called with indicative parameter values. The instrumentation of those function is performed in a way that calls to those functions and parameters used by those calls are detected and captured. The captured data describing those function calls is forwarded to the behavior analysis module 1108.

It is noteworthy that the instrumentation performed by step 1302 is performed as early as possible during the start of a process and may also be performed before or during a trivial technology type detection.

Following step 1303 starts monitoring the calls to those instrumented functions and to record the sequence of those calls performed during the process startup. Step 1303 repetitively (e.g. with each update of the recorded call sequence) compares the recorded call sequence with the function call list 1202 of available interaction pattern records 1201. In case step 1303 detects a match between the recorded call sequence and an interaction pattern record, or in case a specific process startup time (e.g. 10 ms, 50 ms, 100 ms depending on the performance of the underlying hardware and operating system, the expected process startup time and a maximum tolerable monitoring caused process startup delay) has elapsed without a successful match, the process continues with decision step 1304. In case no matching interaction pattern record was identified by step 1303, the process continues with step 1310 which indicates to inject no type specific agent into the process and the process ends afterwards with step 1311. In case a matching interaction pattern record was identified by step 1303, the process continues with decision step 1305 which determines if the pattern unambiguously identifies a technology type, e.g. if the technology type list of the matching interaction pattern record only contains one entry. In case the technology type was identified unambiguously, step 1309 is executed which notifies the injection of the type specific agent for the identified technology type and the process afterwards ends with step 1311.

In case the call pattern based detection of the technology type was ambiguous, e.g. the monitored calls sequence matches multiple technology types, decision step 1306 is performed which determines if a further analysis of data describing the starting process, like the executable binary file used to execute the process is possible. Various conditions may influence this decision, like the number of candidate technology types, the size of the data that needs to be analyzed or if the estimated effort required to identify the correct technology out of the candidates causes a delay of the process start that exceeds a certain limit. In case step 1306 determines that a detailed determination is not possible, the process continues with step 1310 to notify that no type specific agent should be injected. Otherwise, step 1307 may be executed, which analyzes data describing the starting process for indications of one of the candidate technology types. The analysis performed by step 1307 may contain but is not limited to parsing of binary executable files for specific structural information or lookup of specific patterns in the application binary image.

Subsequent decision step 1308 verifies if the check performed by step 1307 was decisive and identified a matching technology type and if a technology type was identified continues with step 1309 which indicates the injection of the type specific agent for the identified technology type. Otherwise, step 1310 is executed which indicates that no technology type specific agent should be injected.

Referring now to FIG. 14 which shows a recording of calls performed during the startup of process proving a Go® runtime environment for the execution of programs written in the Go programming language. Details of the Go environment may be found on the world wide web at golang.org. Experiments showed that various starts of processes providing a Go execution environments perform a set of specific calls 1401 with specific parameter values 1402 in the sequence depicted in FIG. 14. E.g. the sequence of calls "GetProcAddress" with a second parameter identifying the name of the function or procedure for which an address is requested, and the "CreateThread" call and its second and fifth parameter remained identical for all starts of a Go environment. Those calls and the parameter values which remained constant for all starts may be used to create an interaction pattern record 1201 to detect the technology type Go runtime environment.

Other calls 1403 were only performed during a subset of analyzed starts of the Go runtime and are therefore not usable to create such a pattern record.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for injecting agents into processes in a container environment of a host computing device, comprising:
   detecting, by an operating system (o/s) agent, start of a container manager process on the host computing device, wherein the container manager process implements operating-system level virtualization on the host computing device and the o/s agent runs as a process managed by an operating system of the host computing device;
   starting, by the o/s agent, a container manager agent as a process managed by the operating system, where starting of the container manager agent is in response to detecting start of the container manager process;
   detecting, by the container manager agent, creation of a container by the container manager process; and
   configuring, by the container manager agent the container to support injection of monitoring agents into processes running in the container by making libraries which contain an executable for the monitoring agent accessible inside the container, where the processes running in the container are isolated from processes running directly on the operating system using operating-system level virtualization.

2. The method of claim 1 wherein detecting start of a container manager process by comparing name of executable file of a starting process with name of an executable file associated with the container manager process.

3. The method of claim 2 where configuring the container further comprises, modifying a runtime environment of the container where the runtime environment of the container is derived from a persistent container configuration and the modification of the runtime environment of the container is performed after the creation of the container and before a process is started in the container.

4. The method of claim 1 wherein starting a container manager agent further comprises determining process identifier for the container manager process and configuring the container manager agent with the process identifier.

5. The method of claim 4 further comprises configuring the container manager agent by setting the process identifier as a command line parameter of the container manager agent.

6. The method of claim 1 wherein detecting creation of a container further comprises establishing a connection with the container manager process; and receiving a trace event via the connection from the container manager process, where the trace event indicates creation of the container.

7. The method of claim 6 further comprises retrieving register values from the container manager process and determining creation of the container from the retrieved register values.

8. The method of claim 7 further comprises storing the identification data for the container in a file system of the container.

9. The method of claim 6 wherein configuring the container further comprises
   retrieving register values from the container manager process;
   extracting identification data for the container from the retrieved register values;
   extracting a path to a directory in a file system of the operating system from the retrieved register values, where the directory corresponds to the container;
   locating a process start configuration corresponding to the container in the directory in the file system corresponding to the container; and
   changing the process start configuration to load a monitoring agent into any processes running in the container.

10. The method of claim 9 wherein extracting a path further comprises extracting a parameter of a system call, where the parameter indicates a directory in the file system of operating system that will become root file system of the container.

11. The method of claim 9 wherein changing process start configuration further comprises adding name of binary for the monitoring agent to a file in the directory of the file system and copying the binary for the monitoring agent to a library directory of the container.

12. The method of claim 9 further comprises
   loading an instance of the monitoring agent when a given process is started in the container and after the container is started;
   determining, by the monitoring agent, performance data for the given process;
   tagging, by the monitoring agent, the performance data with the identification data for the container; and
   sending an event message, by the monitoring agent, to an event correlator, where the event message includes the performance metric and the event correlator resides on a monitoring node located remotely from the hosting computing device.

13. A method for injecting agents into processes in a container environment of a host computing device, comprising:
   detecting, by a container manager agent, creation of a container from a trace event received from a container manager process, where the container manager agent is a process managed by an operating system of the host computing device and the container manager process implements operating-system level virtualization on the host computing device;
   retrieving register values from the container manager process;
   extracting identification data for the container from the retrieved register values;
   extracting a path to a directory in a file system of the operating system from the retrieved register values, where the directory corresponds to the container;
   locating a process start configuration corresponding to the container in the directory in the file system corresponding to the container; and
   changing the process start configuration to load a monitoring agent into any processes running in the container.

14. The method of claim 13 further comprises
   detecting, by an operating system (o/s) agent, start of the container manager process on the host computing device, where the o/s agent runs as a process managed by an operating system of the host computing device; and
   starting, by the o/s agent, the container manager agent in response to detecting start of the container manager process.

15. The method of claim 13 wherein detecting creation of a container further comprises establishing a process trace connection with the container manager process; and receiving the trace event via the process trace connection.

16. The method of claim 13 further comprises retrieving register values from the container manager process; and determining creation of the container from the retrieved register values.

17. The method of claim 13 further comprises storing, by the container manager agent, the identification data for the container in a file system of the container.

18. The method of claim 13 further comprises
loading an instance of the monitor agent when a given process running the container is started;
determining, by the monitoring agent, performance data for the given process;
tagging, by the monitoring agent, the performance data with the identification data for the container; and
sending an event message, by the monitoring agent, to an event correlator, where the event message includes the performance metric and the event correlator resides on a monitoring node located remotely from the hosting computing device.

19. A system for injecting agents into processes in a container environment of a host computing device, comprising:
a processor;
a storage medium having computer program instructions stored and executed by the processor;
an operating system (o/s) agent configured to detect start of a container manager process on the host computing device, and in response to detecting start of the container manager process, start a container manager agent as a process; managed by the operating system, where the container manager process implements operating-system level virtualization on the host computing device and the o/s agent runs as a process managed by an operating system of the host computing device; and
the container manager agent is configured to detect creation of a container by the container manager process, and configure the container to support injection of monitoring agents into processes running in the container by making libraries which contain an executable for the monitoring agent accessible inside the container, where the processes running in the container are isolated from processes running directly on the operating system using operating-system level virtualization.

20. The system of claim 19 wherein container manager agent detects creation of a container by establishing a connection with the container manager process, and receiving a trace event via the connection from the container manager process, where the trace event indicates creation of the container.

21. The system of claim 19 wherein container manager agent configures the container by retrieving register values from the container manager process, extracting identification data for the container from the retrieved register values, extracting a path to a directory in a file system of the operating system from the retrieved register values, where the directory corresponds to the container, locating a process start configuration corresponding to the container in the directory in the file system corresponding to the container, and changing the process start configuration to load a monitoring agent into any processes running in the container.

22. The system of claim 19 further comprises
a monitoring agent instrumented in a given process started by the container, where the monitoring agent determines performance data for the given process, tags the performance data with the identification data for the container, and sends an event message to an event correlator, where the event message includes the performance data and the event correlator resides on a monitoring node located remotely from the hosting computing device.

23. A method for injecting agents into processes in a container environment of a host computing device, comprising:
starting a container manager agent in a container manager process, where the container manager process resides in a user space of the operating system of the host computing device and implements operating-system level virtualization on the host computing device;
receiving, by the container manager process, a container preparation request for a given container, where the container preparation request includes at least one parameter that describes the configuration for the given container;
intercepting, by the container manager agent, the container preparation request;
modifying, by the container manager agent, the parameter in the container preparation request such that a given directory of a file system maintained by the operating system is accessible from inside the given container, where the modification of the parameter in the container preparation request is in response to receiving the container preparation request and the given directory includes executable instructions for a monitoring agent; and
storing, by the container manager process, the modified parameter as part of container configuration data in a repository accessible to a kernel of the operating system.

24. The method of claim 23 further comprises modifying the parameter in the container preparation request by adding a directory mapping to the parameter.

25. The method of claim 23 further comprises
receiving, by a kernel of the operating system, a container start request for the given container;
starting, by the kernel of the operating system, the given container in response to receiving the container start request and in accordance with the modified parameter in the container configuration data for the given container;
detecting, by an injection procedure, start of a given container process, where the injection procedure is implemented by executable instructions executing in a kernel space of the operating system; and
modifying, by the injection procedure, the start of the given container process, where the modification causes the given container process to load the monitoring agent from the given directory of the file system.

26. The method of claim 25 further comprises
executing an operating system (o/s) agent as a process in a user space of the operating system, wherein the o/s agent is managed by the operating system and the operating system is implemented by executable instructions stored in a non-transitory data store associated with the host computing device;
establishing, by the o/s agent, a data connection across a network with a monitor server located remotely from the host computing device; and
installing, by the o/s agent, the injection procedure into the kernel space of the operating system.

27. The method of claim 26 further comprises monitoring, by the monitoring agent, execution of an application executed by the given container process and sending, by the monitoring agent, performance data describing the execution of the application across the network to the monitor server.

28. The method of claim 23 further comprises instrumenting, by a core agent, a set of calls to be performed by a process managed by the operating system;

monitoring calls made by the process to the operating system during execution of the process;

comparing the monitored calls to a group of predetermined call patterns, where each call pattern in the group of predetermined call patterns indicates a sequence of call patterns and is associated with a type of application platform;

identifying a particular type of application platform based on the comparison of the monitored calls to a group of predetermined call patterns; and injecting at least one of the container manager agent and the monitoring agent into the process in accordance with the identified type of application platform.

* * * * *